United States Patent [19]

Diamantoglou et al.

[11] Patent Number: 5,427,684
[45] Date of Patent: Jun. 27, 1995

[54] DIALYSIS MEMBRANE COMPOSED OF POLYSACCHARIDE ETHER II

[75] Inventors: Michael Diamantoglou, Erlenbach; Gustav Dunweg, Wuppertal; Thomas Rintelen, Schwelm, all of Germany

[73] Assignee: AKZO NV, Arnhem, Netherlands

[21] Appl. No.: 73,359

[22] Filed: Jun. 7, 1993

[30] Foreign Application Priority Data

Jun. 5, 1992 [DE] Germany .................. 42 18 568.8
May 8, 1993 [DE] Germany .................. 43 15 351.8

[51] Int. Cl.$^6$ ................ B01D 63/02; B01D 39/18
[52] U.S. Cl. ................ 210/500.23; 210/500.27; 210/500.29; 536/20; 264/41; 264/199; 264/563
[58] Field of Search ........ 210/500.27, 500.29, 210/500.28, 500.23, 500.31, 500.32, 500.3, 500.38; 536/20; 264/41, 199, 212, 563; 525/54.1; 435/243

[56] References Cited

U.S. PATENT DOCUMENTS

| | | | |
|---|---|---|---|
| 3,745,202 | 7/1973 | Riggleman et al. | 264/41 |
| 3,888,771 | 6/1975 | Isuge et al. | 264/199 |
| 4,220,477 | 9/1980 | Kesting | 264/41 |
| 4,308,377 | 12/1981 | Koshugi | 536/20 |
| 4,424,346 | 1/1984 | Hall et al. | 536/20 |
| 4,791,063 | 12/1988 | Hou et al. | 435/243 |
| 4,962,140 | 10/1990 | Diamantoglou | 210/500.29 |
| 4,997,935 | 3/1991 | Diamantoglou . | |
| 5,026,834 | 6/1991 | Diamantoglou . | |
| 5,055,570 | 10/1991 | Diamantoglou | 210/500.29 |
| 5,059,654 | 10/1991 | Hou et al. | 525/54.1 |
| 5,087,366 | 2/1992 | Diamantoglou | 210/500.23 |
| 5,093,488 | 3/1992 | Diamantoglou . | |
| 5,171,444 | 12/1992 | Diamantoglou et al. | 210/500.23 |

FOREIGN PATENT DOCUMENTS

| | | |
|---|---|---|
| 0319938 | 6/1989 | European Pat. Off. . |
| 0339200 | 11/1989 | European Pat. Off. . |
| 0459293 | 12/1991 | European Pat. Off. . |
| 0550879 | 7/1993 | European Pat. Off. . |
| 3524596 | 1/1987 | Germany . |
| 3826468 | 2/1990 | Germany . |
| 3842822 | 7/1990 | Germany . |
| 4017745 | 12/1991 | Germany . |

OTHER PUBLICATIONS

D. E. Chenoweth et al., "Anaphylatoxin Formation During Hemodialysis: Effects of Different Dialyzer Membranes", *Kidney International*, vol. 24, 1983, pp. 764–769.

D. E. Chenoweth et al., "Biocompatibility of Hemodialysis Membranes", *Asaio–Journal*, vol. 7, Apr./Jun. 1984, pp. 44–49.

*Primary Examiner*—Robert A. Dawson
*Assistant Examiner*—Ana M. Fortuna
*Attorney, Agent, or Firm*—Oliff & Berridge

[57] ABSTRACT

A dialysis membrane for hemodialysis in the form of sheet films, tubular films, or hollow fibers is composed of a polysaccharide ether. The polysaccharide ether has a structure given by the formula

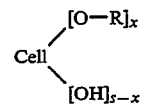

in which cell is the skeleton of the unmodified cellulose molecule or of the chitin molecule, each with no hydroxyl groups, s is equal to 3 for the unmodified cellulose molecule and 2 for the chitin molecule, and x is the degree of etherification, which is in the range from 0.001 to 0.079, and R is an optionally substituted alkyl, alkenyl, alkynyl, cycloalkyl, cycloalkenyl, cycloalkynyl, aryl, arylalkyl, arylalkenyl, and/or arylalkynyl group with 3 to 25 carbon atoms, and/or the radical of a heterocyclic compound with 3 to 25 carbon atoms, in which the carbon chain may be interrupted by oxygen or sulfur atoms.

28 Claims, No Drawings

DIALYSIS MEMBRANE COMPOSED OF POLYSACCHARIDE ETHER II

BACKGROUND OF THE INVENTION

This invention relates to a dialysis membrane for hemodialysis in the form of sheet films, tubular films, or hollow fibers composed of polysaccharide ether.

There are very high demands on dialysis membranes with regard to biocompatibility so that the blood flowing past the membranes is damaged as little as possible. Important parameters of biocompatibility are thrombogenicity, leukopenia, and complement activation.

DE-OS 35 24 596 discloses a dialysis membrane with improved biocompatibility that is able to reduce leukopenia and complement activation to a considerable extent and that is distinguished by modified cellulose whose average degree of substitution is 0.02 to 0.07. The known dialysis membrane composed of modified cellulose preferably contains modified cellulose that has a structure given by the formula

in which
X stands for —NR"— and/or

and/or —S— and/or —SO— and/or —SO$_2$— and/or

and/or —CO—O— and/or —O—
Y stands for —R and/or —NR$_2$ and/or —Si(OR")$_3$ and/or —SO$_3$H and/or —COOH and/or —PO$_3$H$_2$ and/or

and their salts,
R' stands for an alkylene group and/or a cycloalkylene group and/or an arylene group with a total of 1 to 25 carbon atoms,
R" stands for a hydrogen atom or R, and
R stands for an alkyl group with 1 to 5 carbon atoms and/or a cycloalkyl group and/or an aryl group.

However, these membranes show elevated thrombogenicity compared to conventional dialysis membranes, such as Cuprophan ®, for example, especially when the substituent is an ionic group, but above all when the substituent is a basic group.

Furthermore, EP-A-0 459 293 discloses a dialysis membrane for hemodialysis in the form of sheet films, tubular films, or hollow fibers composed of polysaccharide ethers. The polysaccharide ethers have a structure given by the formula

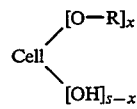

wherein cell is the skeleton of the unmodified cellulose molecule or of the chitin molecule, with no hydroxyl groups in each case, s is equal to 3 for the unmodified cellulose molecule and 2 for the chitin molecule, and x stands for the degree of etherification, which is in the range of 0.08 to (s-0.4), and wherein R is an optionally substituted alkyl, alkenyl and/or alkynyl and/or cycloalkyl and/or cycloalkenyl and/or cycloalkynyl and/or arylalkyl and/or arylalkenyl and/or arylalkynyl and/or bisarylalkyl and/or bisarylalkenyl and/or bisarylalkynyl group with 5 to 40 carbon atoms, and/or the radical of a condensed aromatic (optionally substituted) compound and/or the radical of a heterocyclic (optionally substituted) compound.

The polysaccharide is relatively highly substituted and also contains ionic groups, which likewise increase the thrombogenicity.

Dialysis membranes composed of synthetic or natural polymers can very easily cause clotting of the blood when they are used in artificial kidneys, which is prevented to a great extent by appropriate drug treatment. In addition, however, when a patient receives dialysis treatment with dialyzers that contain membranes composed of regenerated cellulose, a temporary decrease of leukocytes occurs in the initial period of dialysis treatment. This effect is called leukopenia.

Leukopenia is a lowering of the leukocyte count (white blood cells) in the circulatory system. The number of white blood cells in humans is about 4000 to 12,000 cells/mm$^3$. Leukopenia in dialysis is most severe 15 to 20 minutes after the beginning of treatment, during which the neutrophils (leukocytes that can be stained with neutral dyes or at the same time with acidic and basic dyes) may disappear almost completely. The number of leukocytes then recovers to almost the initial value within about an hour, or exceeds it. If a new dialyzer is connected after the recovery of the leukocytes, leukopenia occurs again to the same extent.

Cellulose membranes cause pronounced leukopenia. Although the clinical significance of leukopenia is not scientifically clear, there is nevertheless a desire for a dialysis membrane for hemodialysis that does not show the effect of leukopenia, without impairing the desired positive characteristics of dialysis membranes composed of regenerated cellulose.

Distinct complement activation has been found in addition to leukopenia during hemodialysis with membranes composed of regenerated cellulose. The complement system in the blood serum is a complex plasma enzyme system consisting of many components that serves in various ways as a defense against damage from invading foreign cells (bacteria etc.). If antibodies against the invading organism are present, complement-specific activation can occur from the complex of the antibodies with antigenic structures of the foreign cells; otherwise complement activation occurs on an alternate pathway through distinctive surface features of the foreign cells. The complement system depends on a number of plasma proteins. After activation, these proteins react specifically with one another in a definite sequence, and at the end a cell-damaging complex is formed that destroys the foreign cells.

Peptides are liberated from individual components that trigger inflammatory symptoms and sometimes also may have adverse pathological consequences for the body. It is assumed that activation with hemodialysis membranes composed of regenerated cellulose occurs over the alternate pathway. These complement activations are identified objectively by determination of the complement fragments C3a and C5a.

Reference is made in this regard to the following papers: D. E. Chenoweth et al., Kidney International Vol. 24, pages 764 ff, 1983, and D. E. Chenoweth, Asaio-Journal Vol. 7, pages 44 ff, 1984.

It is also desirable to prevent thrombogenicity and the heparin absorption that occurs to a substantial extent particularly with the polysaccharide ethers pursuant to DE-OS 35 24 596. A reusable dialysis membrane composed of polysaccharide ethers with an even lower degree of modification than that described in EP-A-0 459 293 is also desirable to reduce costs.

However, in the procedures used up to now to prepare for reuse, precisely the parameter critical for biocompatibility is distinctly impaired, and steam sterilization leads to yellowing of the membranes.

Although dialysis membranes composed of polysaccharide ether with usable biocompatibility characteristics are already known, there is a need to improve them further.

SUMMARY OF THE INVENTION

A purpose of this invention was to make available dialysis membranes composed of polysaccharide ethers with very low substitution, which show thrombogenicity and heparin absorption comparable to Cuprophan ®, and which are reusable.

This problem is solved by providing a dialysis membrane comprising a polysaccharide ether having a structure given by the formula

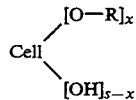

wherein cell is the skeleton of the unmodified cellulose molecule or of the chitin molecule, each with no hydroxyl groups, s is equal to 3 for the unmodified cellulose molecule and 2 for the chitin molecule, and x stands for the degree of etherification, which is in the range of 0.001 to 0.079, and wherein R is an optionally substituted alkyl, alkenyl, alkynyl, cycloalkyl and/or cycloalkenyl, cycloalkynyl, aryl, arylalkyl, arylalkenyl, and/or arylalkynyl group with 3 to 25 carbon atoms, and/or the radical of a heterocyclic compound with 3 to 25 carbon atoms, in which the carbon chain may be interrupted by oxygen or sulfur atoms.

DESCRIPTION OF PREFERRED EMBODIMENTS

The properties of the membrane material can be controlled through the group R, for example solubility in aqueous systems and the viscosity of such a solution.

According to one embodiment, preferred polysaccharide ethers are those in which the substituted radical contains a nonionic group such as OR', SR', halogen, and/or R', in which R'=H, methyl, ethyl, or R.

According to another preferred embodiment, R stands for a benzyl, methylbenzyl, methoxybenzyl, chlorobenzyl, hexyl, dodecyl, or octadecyl group.

According to another preferred embodiment of the invention, R stands for a hydroxypropyl, hydroxybutyl, hydroxydodecyl, 2-hydroxypropyl butyl ether, 2-hydroxypropyl dodecyl ether, 2-hydroxypropyl cyclohexyl ether, 2-hydroxypropyl benzyl ether, or 2-hydroxypropyl phenyl ether group.

In a preferred embodiment of the invention, the degree of etherification x is from 0.001 to 0.019. In another preferred embodiment of the invention, the degree of etherification x is from 0.071 to 0.079.

The dialysis membrane is preferably produced from an aqueous spinning solution that contains polysaccharide ethers. The aqueous spinning solution is preferably a cuprammonium solution.

The membrane can also be produced from an aqueous tertiary amine N-oxide solution that contains polysaccharide ethers. The tertiary amine N-oxide spinning solution in that case is preferably a solution of N-methylmorpholine N-oxide.

According to another embodiment of the invention, the membrane can be produced from an organic amide solvent containing lithium chloride that contains the polysaccharide ether. The solvent containing lithium chloride in this case is lithium chloride/dimethylacetamide or lithium chloride/N-methylpyrrolidone.

The spinning solution preferably contains 2 to 25 wt. % polysaccharide, but it is especially preferred for it to contain 5–15 wt. % polysaccharide. The spinning solution preferably has a viscosity of 10 to 300 Pa.s.

It has proved to be advantageous for the invention for the polysaccharide ether to have a degree of polymerization (DP) of 200 to 5000.

In the context of this invention, the average degree of substitution (x) of the polysaccharide modified by substitution is intended to mean the average number of substituents for each anhydroglucose unit. The average degree of substitution can be adjusted by the molar ratio of polysaccharide to etherification reagent or by mixing differently substituted polysaccharides or by mixing substituted with unsubstituted polysaccharides.

In the context of this invention, complement activation was evaluated with reference to the C5a fragments. For this purpose, 300 ml of heparinized blood plasma was recirculated in vitro for a period of 4 hours with a plasma flowrate of 100 ml/min through a dialyzer with an effective exchange area of 1 m². The C5a fragments in the plasma were determined by the RIA method (Upjohn test). The relative complement activation at the particular time of measurement was calculated in percent from the ratio of the concentration at the time of sampling to the initial value. The value measured after 4 hours of circulation was used for evaluation. Sheet membranes were incubated for 3 hours with heparinized blood plasma and the C5a fragments then determined.

Thrombogenicity was evaluated from TAT (thrombinantithrombin) and PC (platelet count).

The increase of the beta-2-microglobulin level in long-term dialysis patients after using membranes composed of regenerated cellulose is observed, and is attributed to the fact that these membranes show lower permeability in the molecular weight range of from 1000 to 20,000, and the microglobulins are therefore not removed to a sufficient extent during dialysis. Beta-2-microglobulin is not adsorbed to a significant extent on conventional membranes composed of regenerated cellulose. However, the cellulose derivatives pursuant to the invention contribute to this in an unexpected manner.

The average degree of polymerization DP was determined in a cuene solution by the method of DIN 54270.

The degree of etherification was determined from the analytical results that are known and typical for the substituents, for example nitrogen by the Kjeldahl method, sulfur by the Schöniger method, and alkyl and aryl groups using NMR spectroscopy.

Embodiments of the invention are illustrated by the following examples.

Example 1

324 g (2 moles) of linters cellulose (DP: 1350 in cuene) is alkalized for 1 hour at 16° C. in a 10-liter Drais mixer with 55.2 g (1.38 moles) of sodium hydroxide dissolved in 250 ml of water. After adding 250 ml of isopropanol and 58.19 g (0.46 mole) of benzyl chloride, the mixture is stirred for 6 hours at 80° C. The reaction product is taken up in ethanol, filtered by suction, washed successively with ethanol, water, and ethanol until free of alkali and chloride, and dried in a vacuum drying oven at 60° C. 336.8 g of a product are obtained with a degree of etherification of x=0.076.

A cuprammonium solution containing 9 wt. % polysaccharide is prepared from this benzylcellulose by conventional methods and is processed into sheet membranes in the laboratory. The C5a activation is reduced by 95% compared to unmodified cellulose membrane. The thrombogenicity is comparable with that of Cuprophan ®.

Some of the membranes are sterilized at 121° C. for 30 minutes with steam. After the steam treatment, the membranes show a C5a reduction of 85% compared to unmodified cellulose membrane.

A 15-minute treatment of the membranes with 1% aqueous sodium hypochlorite solution and 4% aqueous peracetic acid solution likewise leads to no significant loss of activity. The C5a reduction is 90%.

The membranes absorb no heparin according to the test method of Deutschen Kabi Vitrum GmbH, Diagnostics.

Examples 2-5

The benzylcellulose from Example 1 is blended with various quantities of unmodified linters cellulose, dissolved in cuprammonium solution (9 wt. % polysaccharide content), and processed into sheet membranes in the laboratory. The blending ratio and the C5a reduction obtained compared to unmodified cellulose membrane are tabulated in Table 1.

The membranes of Examples 2 to 5 show thrombogenicity comparable to that of Cuprophan ®.

TABLE 1

| Example | Blending Ratio Benzylcellulose Parts | Blending Ratio Linters Cellulose Parts | x | C5a Reduction % |
|---|---|---|---|---|
| 2 | 20 | 80 | 0.015 | 86 |
| 3 | 15 | 85 | 0.011 | 80 |
| 4 | 10 | 90 | 0.007 | 77 |
| 5 | 5 | 95 | 0.004 | 55 |

Example 6

9720 g (60 moles) of linters cellulose (DP=1350 in cuene) is alkalized for 1 hour at 18° C. in a 250-liter Drais mixer with 1800 g (45 moles) of sodium hydroxide dissolved in 13.5 liters of water. After adding 1897.5 g (15 moles) of benzyl chloride, the mixture is stirred for 4 hours at 90° C. The reaction product is taken up in 200 liters of water, centrifuged off, washed in succession with water, isopropanol, and water, and dried in a circulating-air drying oven at 60° C. 10 kg of a product is obtained with a degree of etherification of x=0.078.

A cuprammonium spinning solution that contained 9 wt. % benzylcellulose, 8.3 wt. % $NH_3$, and 3.9 wt. % Cu is prepared by conventional methods from this benzylcellulose. This spinning solution is spun into a hollow fiber by means of a hollow fiber spinning nozzle whose annular slit has a discharge area of 0.47 $mm^2$ and whose internal filler infeed has a diameter of 0.85 mm, with the spinning solution emerging perpendicularly downward from the spinning nozzle together with isopropanol myristate as the cavity-forming internal filler, and after an air path of 4 cm, dipping into an aqueous precipitation bath at 40° C. that contains 110 g/l $H_2SO_4$. The quantity of spinning solution is 4.5 ml/min and the quantity of internal filler is 2.1 ml/min.

The hollow fiber solidifies in the precipitation bath and is fed through conventional baths with diluted sulfuric acid and water for regeneration and neutralization; at the end of the path it is fed through an aqueous glycerin bath, and is then dried on a drum dryer at 75° C. to a residual water content of 10.2%. The glycerin content of the dried fiber is 4.4%.

With a spinning speed of 55 m/min, a hollow fiber is formed with a wall thickness of 8.7 $\mu$m and an inside diameter of 202 $\mu$m.

The breaking strength of this hollow fiber is 119 cN with an elongation of 26.2% at failure.

The hollow fiber is processed into test specimens with which the following data are determined:

UFR: 8.1 ml/h.$m^2$.mm Hg
DL-Vit.B12: 6.6 cm/min.$10^{-3}$
DL-creatinine: 54.5 cm/min.$10^{-3}$
(DL=dialysis efficiency)

The screening coefficient for albumin is zero, and that for cytochrome-C is 0.15.

C5a activation is reduced by 92% compared to Cuprophan ®. Thrombogenicity and heparin absorption are comparable with those of Cuprophan ®.

Example 7

9720 g (60 moles) of linters cellulose (DP=1350 in cuene) is alkalized for 1 hour at 18° C. in a 250-liter Drais mixer with 1944 g (48.6 moles) of sodium hydroxide dissolved in 13.5 liters of water. After adding 2049.3 g (16.2 moles) of benzyl chloride, the mixture is stirred at 90° C. for 2 hours. The reaction product is taken up in 200 liters of water, centrifuged off, washed in succession with water, isopropanol, and water, and dried in a circulating-air drying oven at 60° C. 10.1 kg of a product with a degree of etherification of x=0.088 is obtained.

A cuprammonium spinning solution that contained 7.2 wt. % linters cellulose, 1.8 wt. % of the benzylcellulose synthesized above, 8.3 wt. % $NH_3$, and 3.9 wt. % Cu is obtained by known procedures. This solution is spun into a hollow fiber by means of a hollow fiber spinning nozzle whose annular slit has a discharge area of 0.47 $mm^2$ and whose internal filler infeed has a diameter of 0.85 mm, with the spinning solution emerging from the spinning nozzle perpendicularly downward together with isopropyl myristate as the cavity-forming internal filler; after an air path of 4 cm it dips into an aqueous precipitation bath at 18° C. that contains 110 g/l NaOH, 4 g/l NH$_3$, and 0.8 g/l Cu. The quantity of spinning solution is 4.5 ml/min and the quantity of internal filler is 2.1 ml/min.

The hollow fiber solidifies in the precipitation bath and is fed through conventional baths with dilute sulfuric acid and water for regeneration and neutralization; at the end of the path it is fed through an aqueous glycerin bath and is then dried on a drum dryer at 75° C. to a residual water content of 10.5%. The glycerin content of the dried fiber is 4.5%. The hollow fiber shows an average degree of etherification of x=0.017.

With a spinning speed of 55 m/min, a hollow fiber is formed with a wall thickness of 8.2 μm and an inside diameter of 204 μm. The breaking strength of this hollow fiber is 118 cN with an elongation at failure of 28.2%.

The hollow fiber is processed into test specimens on which the following data are determined:
UFR: 7.5 ml/h.m$^2$.mm Hg
DL-Vit.B12: 6.8 cm/min.10$^{-3}$
DL-creatinine: 56.5 cm/min.10$^{-3}$ The screening coefficient for albumin is zero, and that for cytochrome-C is 0.18.

C5a activation is reduced by 90% compared to Cuprophan ®. Thrombogenicity and heparin absorption are comparable with those of Cuprophan ®.

Example 8

A cuprammonium spinning solution with the same composition as in Example 7 is spun into hollow fibers in an aqueous precipitation bath at 40° C. that contained 110 g/l H$_2$SO$_4$. The other spinning conditions are the same as those in Example 7.

The hollow fiber solidified in the acidic precipitation bath passes through all conventional baths and the drum dryer as in Example 7. The test specimens made from this hollow fiber show the following data:
Degree of etherification: x=0.017
UFR: 5.8 ml/h.m$^2$.mm Hg
DL-Vit. B12: 6.5 cm/min.10$^{-3}$
DL-creatinine: 52 cm/min.10$^{-3}$
Screening coefficient for albumin: 0
Screening coefficient for cytochrome-C: 0.11

The mechanical data are almost unchanged, specifically breaking strength of 124 cN and elongation at failure of 27.8%. The wall thickness is 7.9 μm and the inside diameter is 198 μm.

C5a activation is reduced by 88% compared to Cuprophan ®. Thrombogenicity is comparable with that of Cuprophan ®.

Example 9

A cuprammonium spinning solution containing 4.9 wt. % linters cellulose, 1.3 wt. % benzylcellulose from Example 6, 8.5 wt. % NH$_3$, and 2.6 wt. % Cu is prepared. This solution is spun into a hollow fiber by means of a hollow fiber nozzle with a discharge slit with an area of 0.08 mm$^2$ and an internal filler bore 0.25 mm in diameter with the spinning nozzle being installed 18 cm beneath the surface of the precipitation bath with its discharge orifices pointing upward. Dry nitrogen is used as an internal filler. The quantity of spinning solution is 7.0 ml/min and the quantity of nitrogen is 2.0 ml/min at a pressure of 22 mbar.

The aqueous precipitation bath (temperature=19.5° C.) contains 130 g/l NaOH, 6 g/l NH$_3$, and 0.5 g/l Cu.

The hollow fiber emerging from the submerged spinning nozzle is fed perpendicularly upward through the precipitation bath and is turned into the machining direction for further treatment at a height of 30 cm above the bath surface. The rest of the treatment is carried out in conventional baths as in Example 7.

After drying, the hollow fiber contains a residual quantity of 16% water and a glycerin content of 52%. The average degree of etherification is x=0.016. The wall thickness is 18.2 μm and the inside diameter is 204 μm with a breaking strength of 62 cN and an elongation of 52% at failure.

The following data are measured for this material:
UFR: 56 ml/h.m$^2$.mm Hg
DL-Vit.B12: 15.8 cm/min.10$^{-3}$
DL-creatinine: 58 cm/min.10$^{-3}$
Screening coefficient for albumin: 0.045
Screening coefficient for cytochrome-C: 0.815

C5a activation is reduced by 82% compared to Cuprophan ®. The thrombogenicity parameters TAT and PC are comparable with those of standard Cuprophan ®.

On the other hand, hollow fibers composed of pure linters cellulose made under the same spinning conditions show distinctly higher TAT figures. They are 40% higher than those of standard Cuprophan ®.

Substantially higher TAT figures are measured in this series of tests on hollow fibers consisting of diethylaminoethylcellulose with an average degree of etherification of x=0.02 that are made by a method similar to that of Example 7. They are 80% higher than those of standard Cuprophan ®.

Example 10

A cuprammonium spinning solution with the same composition as Example 7 is spun into a hollow fiber with an immersed spinning nozzle and a nitrogen internal filler using the same spinning system as in Example 9.

The spinning nozzle has a discharge area of 0.06 mm$^2$; the bore of the internal filler infeed is 0.25 mm in diameter.

4.6 ml/min of spinning solution and 2.0 ml of nitrogen are extruded together at a pressure of 22 mbar, with the spinning speed being 55 m/min. The plasticizer bath contains an aqueous solution of 9 g/l glycerin.

The dry hollow fiber has a wall thickness of 8.1 μm and an inside diameter of 202 μm; the glycerin content is 4.8%. The average degree of etherification is x=0.017.

With a breaking strength of 118 cN and an elongation at failure of 51%, the hollow fiber membrane shows the following efficiency:
UFR: 6.1 ml/h.m$^2$.mm Hg
DL-Vit.B12: 7.1 ml/h.m$^2$.mm Hg
DL-creatinine: 56 ml/h.m$^2$.mm Hg
Screening coefficient for albumin: 0
Screening coefficient for cytochrome-C: 0.14

C5a activation is reduced by 89% compared to Cuprophan ®. The thrombogenicity is comparable with that of Cuprophan ®.

Example 11

A cuprammonium spinning solution with the same composition as Example 7 is cast through a Cuprophan ® sheet caster with a casting width of 60 cm and a casting slit width of 0.25 mm into an aqueous precipitation bath that contains 90 g/l NaOH, 6 g/l NH$_3$, and 0.8 g/l Cu, so that the spinning solution emerging from the sheet caster drops through an air gap 18 mm wide, then submerges to a depth of 80 cm in the precipitation bath, and after being turned at this point by a driven roller, it runs an additional 250 cm through the precipitation bath.

The regeneration and rinsing customary for Cuprophan ® are then carried out in the conventional baths.

A sheet membrane 32 cm wide and 14 μm thick is formed with 8.5% residual moisture and a glycerin content of 32%. The sheet membrane has an average degree of etherification of x=0.017.

The following data are measured for this sheet membrane:
UFR: 6.5 ml/h.m².mm Hg
DL-Vit.B12: 8.1 cm/min.$10^{-3}$
DL-creatinine: 51.5 cm/min.$10^{-3}$
DL-urea: 56 cm/min.$10^{-3}$
DL-NaCl: 61 cm/min.$10^{-3}$ The permeability for albumin is zero, and the screening coefficient for cytochrome-C is 0.11.

C5a activation is reduced by 81% compared to Cuprophan ® sheet membrane.

The thrombogenicity is comparable with that of Cuprophan ®. The membrane absorbs no heparin.

Example 12

324 g (2 moles) of linters cellulose (DP: 1350 in cuene) is alkalized for 1 hour at 16° C. in a 10-liter Drais mixer with 10 g (0.25 mole) of sodium hydroxide dissolved in 250 ml of water. After adding 250 ml of isopropanol and 6.325 g (0.05 mole) of benzyl chloride, the mixture is stirred for 6 hours at 80° C. The reaction product is taken up in ethanol, filtered by suction, washed successively with ethanol, water, and ethanol until free of alkali and chloride, and dried in a vacuum drying oven at 60° C. 320 g of a product is obtained with a degree of etherification of x=0.006 and a DP of 1050 (in cuene).

A cuprammonium solution containing 9 wt. % benzylcellulose is prepared by a known procedure. The viscosity determined with a Ubbelohde viscosimeter according to Equation 1 ($\eta$) is 36 Pa.s.

Equation 1: $\eta_{rel} = \frac{\text{throughput time of the solution}}{\text{throughput time of the solvent}}$

Example 13

324 g (2 moles) of linters cellulose (DP: 1350 in cuene) is alkalized for 1 hour at 16° C. in a 10-liter Drais mixer with 16 g (0.40 mole) of sodium hydroxide dissolved in 400 ml of water. After adding 25.3 g (0.20 mole) of benzyl chloride, the mixture is stirred for 4 hours at 80° C. The reaction product is taken up in ethanol, filtered by suction, washed successively with ethanol, water, and ethanol until free of alkali and chloride, and dried in a vacuum drying oven at 60° C. 321 g of a product is obtained with a degree of etherification of x=0.02 and a DP of 900 (in cuene).

The viscosity of a cuprammonium solution containing 9 wt. % benzylcellulose is 20 Pa.s.

Examples 14–19

By the same method as in Examples 12 and 13, the cellulose ethers listed in Table 2 are synthesized, dissolved in cuprammonium solution, and their viscosity is determined. (Examples 14 to 17). Linters cellulose (Example 18) and cellulose (Example 19) are shown in Table 2 for comparison with these.

TABLE 2

| Example | R | x | DP (in cuene) | Ether Concentration (wt. %) | Viscosity Pa · s |
|---|---|---|---|---|---|
| 14 | Benzyl | 0.05 | 850 | 9 | 24 |
| 15 | Benzyl | 0.075 | 820 | 9 | 46 |
| 16 | Dodecyl | 0.008 | 900 | 12 | 20 |
| 17 | Dodecyl | 0.013 | 860 | 10 | 25 |
| 18 (Linters cellulose) | — | — | 1350 | 9 | 100 |
| 19 (Cellulose) | — | — | 600 | 9 | 45 |

Example 20

A cuprammonium spinning solution containing 5.89 wt. % linters cellulose, 0.31 wt. % benzylcellulose from Example 6, 8.5 wt. % NH3, and 2.6 wt. % Cu is prepared. This solution is spun into a hollow fiber by means of a hollow fiber nozzle with a discharge slit that has an area of 0.08 mm² and an internal filler bore 0.25 mm in diameter, with the spinning nozzle installed 18 cm below the surface of the precipitation bath with its discharge orifices pointing upward. Dry nitrogen is used as an internal filler. The amount of spinning solution is 7.0 ml/min and the quantity of nitrogen is 2.0 ml/min at a pressure of 22 mbar.

The aqueous precipitation bath (temperature=19.5° C.) contains 130 g/l NaOH, 6 g/l NH3, and 0.5 g/l Cu.

The hollow fiber emerging from the submerged spinning nozzle is fed perpendicularly upward through the precipitation bath, and is turned into the machining direction for further treatment at a height of 30 cm above the bath surface.

Further treatment is carried out in conventional baths as in Example 7.

After drying, the hollow fiber contains a residual quantity of 16% water and has a glycerin content of 52%. The average degree of etherification is x=0.0037.

The wall thickness is 18.2 μm and the inside diameter is 204 μm with a breaking strength of 62 cN and elongation of 52% at failure.

The following data are measured for this material:
UFR: 56 ml/h.m².mm Hg
DL-VIT.B12: 15.7 cm/min.$10^{-3}$
DL-creatinine: 58 cm/min.$10^{-3}$
Screening coefficient for albumin: 0.043
Screening coefficient for cytochrome-C: 0.819

C5a activation is reduced by 78% compared to Cuprophan ®. The thrombogenicity parameters TAT and PC as well as heparin absorption are comparable with those of standard Cuprophan ®.

Example 21

324 g (2 moles) of linters cellulose (DP: 1350 in cuene) is alkalized for 1 hour at 16° C. in a 10-liter Drais mixer with 40 g (1 mole) of sodium hydroxide dissolved in 350 ml of water. After adding 80 ml of isopropanol and 78 g (0.60 mole) of t-butyl glycidyl ether, the mixture is stirred for 4 hours at 75° C. The reaction product is taken up in ethanol, filtered by suction, washed successively with ethanol, water, and ethanol until free of alkali, and dried in a vacuum drying oven at 60° C. 332.5 g of a product is obtained with a degree of etherification of x=0.077.

A cuprammonium solution containing 9 wt. % polysaccharide is prepared from this product by a conventional procedure and processed into sheet membranes in the laboratory. C5a activation is reduced by 75% compared to unmodified cellulose membrane. Thrombogenicity and heparin absorption are comparable with those of standard Cuprophan ®.

Examples 22–26

By the same method as in Example 21, the cellulose derivatives listed in Table 3 are synthesized by the reaction of linters cellulose with butyl glycidyl ether, benzyl glycidyl ether, dodecyl glycidyl ether, cyclohexyl glycidyl ether, dodecane epoxide, and 1,2-epoxy-3-phenoxypropane; they are processed into sheet membranes from cuprammonium solution and tested. The modified membranes show reduced C5a activation compared to unmodified cellulose membrane. Their thrombogenicity and heparin absorption are comparable with those of standard Cuprophan ®.

TABLE 3

| Example | R | x | C5a Reduction |
|---|---|---|---|
| 22 | $-CH_2-CH(OH)-CH_2-O-nC_4H_9$ | 0.079 | 70 |
| 23 | $-CH_2-CH(OH)-CH_2-O-CH_2-C_6H_5$ | 0.075 | 85 |
| 24 | $-CH_2-CH(OH)-CH_2-O-C_{12}H_{25}$ | 0.076 | 80 |
| 25 | $-CH_2-CH(OH)-CH_2-O-C_6H_5$ | 0.078 | 85 |
| 26 | $-CH_2-CH(OH)-CH_2-O-C_6H_{11}$ | 0.074 | 80 |
| 27 | $-CH_2-CH(OH)-C_{10}H_{21}$ | 0.072 | 75 |

Example 28

8 g of benzylcellulose from Example 6 is blended in a duplex kneader with 15 g of water and 77 g of N-methylmorpholine N-oxide. The mixture is then heated at 110° C. until the benzylcellulose has completely dissolved. The solution is coated on a hot plate using a film coater, and then precipitated with water. The membrane is thoroughly washed with water and tested. C5a activation is reduced by 90% compared to unmodified membrane. Thrombogenicity and heparin absorption are comparable with those of standard Cuprophan ®.

Example 29

40 g of benzylcellulose from Example 6 is dissolved in 880 g of dimethylacetamide and 80 g of lithium chloride in a three-necked flask with stirrer and reflux condenser and processed into sheet membranes. C5a activation is reduced by 93% compared to unmodified membrane. Thrombogenicity and heparin absorption are comparable with those of standard Cuprophan ®.

What is claimed is:

1. A dialysis membrane for hemodialysis comprising a sheet film, tubular film, or hollow fiber composed of polysaccharide ether, the polysaccharide ether having a structure given by the formula

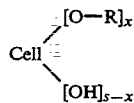

in which cell is the skeleton of an unmodified cellulose molecule or of a chitin molecule, each with no hydroxyl groups, s is equal to 3 when the cell is the skeleton of an unmodified cellulose molecule and 2 when the cell is the skeleton of a chitin molecule, x is the degree of etherification in the range of from 0.001 to 0.079, and R is at least one substituted or unsubstituted group selected from the group consisting of alkyl, alkenyl, alkynyl, cycloalkyl, cycloalkenyl, cycloalkynyl, aryl, arylalkyl, arylalkenyl, arylalkynyl group with 3 to 25 carbon atoms, and a radical of a heterocyclic compound with 3 to 25 carbon atoms, in which the carbon chain may be interrupted by oxygen or sulfur atoms.

2. A dialysis membrane according to claim 1, wherein said radical is substituted with a nonionic group.

3. A dialysis membrane according to claim 2, wherein the nonionic group is selected from the group consisting of OR', SR', halogen, and R', in which R' is hydrogen, methyl, ethyl, or R.

4. A dialysis membrane according to claim 1, wherein R is a benzyl, methylbenzyl, methoxybenzyl, chlorobenzyl, hexyl, dodecyl, or octadecyl group.

5. A dialysis membrane according to claim 1, wherein R is selected from the group consisting of a hydroxypropyl, hydroxybutyl, hydroxydodecyl, 2-hydroxypropyl butyl ether, 2-hydroxypropyl dodecyl ether, 2-hydroxypropyl cyclohexyl ether, 2-hydroxypropyl benzyl ether, and 2-hydroxypropyl phenyl ether group.

6. A dialysis membrane according to claim 1, wherein x is from 0.071 to 0.079.

7. A dialysis membrane according to claim 1, wherein the membrane is produced from an aqueous spinning solution that contains the polysaccharide ether.

8. A dialysis membrane according to claim 7, wherein the aqueous spinning solution is a cuprammonium solution.

9. A dialysis membrane according to claim 7, wherein the membrane is produced from an aqueous tertiary amine N-oxide spinning solution that contains the polysaccharide ether.

10. A dialysis membrane according to claim 9, wherein the aqueous N-oxide spinning solution is a solution of N-methylmorpholine N-oxide.

11. A dialysis membrane according to claim 7, wherein the membrane is produced from an organic amide solvent containing lithium chloride that contains the polysaccharide ether.

12. A dialysis membrane according to claim 11, wherein the solvent containing lithium chloride is lithium chloride/dimethylacetamide or lithium chloride/N-methylpyrrolidone.

13. A dialysis membrane according to claim 7, wherein the spinning solution contains 2 to 25 wt. % polysaccharide ether.

14. A dialysis membrane according to claim 13, wherein the spinning solution contains 5 to 15 wt. % polysaccharide ether.

15. A dialysis membrane according to claim 7, wherein the spinning solution has a viscosity of from 10 to 300 Pa.s.

16. A dialysis membrane for hemodialysis comprising a sheet film, tubular film, or hollow fiber composed of polysaccharide ether, the polysaccharide ether having a structure given by the formula

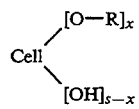

in which cell is the skeleton of an unmodified cellulose molecule or of a chitin molecule, each with no hydroxyl groups, s is equal to 3 when the cell is the skeleton of an unmodified cellulose molecule and 2 when the cell is the skeleton of a chitin molecule, x is the degree of etherification in the range of from 0.001 to 0.019, and R is at least one substituted or unsubstituted group selected from the group consisting of alkyl, alkenyl, alkynyl, cycloalkyl, cycloalkenyl, cycloalkynyl, aryl, arylalkyl, arylalkenyl, arylalkynyl group with 3 to 25 carbon atoms, and a radical of a heterocyclic compound with 3 to 25 carbon atoms, in which the carbon chain may be interrupted by oxygen or sulfur atoms.

17. A dialysis membrane according to claim 16, wherein said radical is substituted with a nonionic group.

18. A dialysis membrane according to claim 17, wherein the nonionic group is selected from the group consisting of OR', SR', halogen, and R', in which R' is hydrogen, methyl, ethyl, or R.

19. A dialysis membrane according to claim 16, wherein R is a benzyl, methylbenzyl, methoxybenzyl, chlorobenzyl, hexyl, dodecyl, or octadecyl group.

20. A dialysis membrane according to claim 16, wherein R is selected from the group consisting of a hydroxypropyl, hydroxybutyl, hydroxydodecyl, 2-hydroxypropyl butyl ether, 2-hydroxypropyl dodecyl ether, 2-hydroxypropyl cyclohexyl ether, 2-hydroxypropyl benzyl ether, and 2-hydroxypropyl phenyl ether group.

21. A dialysis membrane according to claim 16, wherein the polysaccharide ether has a degree of polymerization (DP) of from 200 to 5000.

22. A dialysis membrane for hemodialysis comprising a sheet film, tubular film, or hollow fiber composed of polysaccharide ether having a degree of polymerization (DP) of from 200 to 5000, the polysaccharide ether having a structure given by the formula

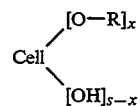

in which cell is the skeleton of an unmodified cellulose molecule or of a chitin molecule, each with no hydroxyl groups, s is equal to 3 when the cell is the skeleton of an unmodified cellulose molecule and 2 when the cell is the skeleton of a chitin molecule, x is the degree of etherification in the range of from 0.001 to 0.079, and R is at least one substituted or unsubstituted group selected from the group consisting of alkyl, alkenyl, alkynyl, cycloalkyl, cycloalkenyl, cycloalkynyl, aryl, arylalkyl, arylalkenyl, arylalkynyl group with 3 to 25 carbon atoms, and a radical of a heterocyclic compound with 3 to 25 carbon atoms, in which the carbon chain may be interrupted by oxygen or sulfur atoms.

23. A dialysis membrane according to claim 22, wherein said radical is substituted with a nonionic group.

24. A dialysis membrane according to claim 23, wherein the nonionic group is selected from the group consisting of OR', SR', halogen, and R', in which R' is hydrogen, methyl, ethyl, or R.

25. A dialysis membrane according to claim 22, wherein R is a benzyl, methylbenzyl, methoxybenzyl, chlorobenzyl, hexyl, dodecyl, or octadecyl group.

26. A dialysis membrane according to claim 22, wherein R is selected from the group consisting of a hydroxypropyl, hydroxybutyl, hydroxydodecyl, 2-hydroxypropyl butyl ether, 2-hydroxypropyl dodecyl ether, 2-hydroxypropyl cyclohexyl ether, 2-hydroxypropyl benzyl ether, and 2-hydroxypropyl phenyl ether group.

27. A dialysis membrane according to claim 22, wherein x is from 0.001 to 0.019.

28. A dialysis membrane according to claim 22, wherein x is from 0.071 to 0.079.

* * * * *